United States Patent
Kessel et al.

(10) Patent No.: US 8,775,552 B1
(45) Date of Patent: Jul. 8, 2014

(54) METHODS AND SYSTEMS FOR DISTRIBUTION OF TECHNICAL MANUALS

(75) Inventors: Jamie A. Kessel, Kent, WA (US); Michael E. Norman, Auburn, WA (US); Kenneth C. Krzyzewski, Bellevue, WA (US); Vu-Minh N. Nguyen, Renton, WA (US)

(73) Assignee: The Boeing Company, Chicago, IL (US)

( * ) Notice: Subject to any disclaimer, the term of this patent is extended or adjusted under 35 U.S.C. 154(b) by 906 days.

(21) Appl. No.: 12/766,052

(22) Filed: Apr. 23, 2010

(51) Int. Cl.
*G06F 15/16* (2006.01)

(52) U.S. Cl.
USPC .......................................... 709/217; 370/400

(58) Field of Classification Search
USPC ................................................ 709/217, 248
See application file for complete search history.

(56) References Cited

U.S. PATENT DOCUMENTS

| | | | |
|---|---|---|---|
| 2002/0147850 A1* | 10/2002 | Richards et al. | 709/248 |
| 2004/0220815 A1* | 11/2004 | Belanger et al. | 705/1 |
| 2005/0138540 A1* | 6/2005 | Baltus et al. | 715/511 |
| 2007/0101259 A1* | 5/2007 | Grigoriadis et al. | 715/517 |
| 2010/0131939 A1* | 5/2010 | Hieb et al. | 717/169 |

OTHER PUBLICATIONS

Unknown, S1000D Information Resource for Technical Authors and Technical Documentation Managers, 5 pages.

* cited by examiner

*Primary Examiner* — Glenford Madamba
(74) *Attorney, Agent, or Firm* — Armstrong Teasdale LLP

(57) ABSTRACT

A method is described for providing a current version of a technical manual to a client computer system that has a prior version of the technical manual. Delta data representing a plurality of differences between the prior version of the technical manual and the current version of the technical manual is generated. The delta data are transmitted to the client computer system, and the client computer system applies the delta data to the prior version of the technical manual to produce the current version of the technical manual.

19 Claims, 8 Drawing Sheets

METHODS AND SYSTEMS FOR DISTRIBUTION OF TECHNICAL MANUALS

BACKGROUND

The field of the disclosure relates generally to data updates for computer systems, and more specifically, to methods and systems for distribution of technical manuals, for example, to aircraft maintenance computers.

Currently, data packages representing revised and/or updated equipment maintenance procedures and the like (e.g., in S1000D format) are manually distributed to client computer systems, such as maintenance laptops. An equipment supplier (e.g., an aircraft manufacturer) will typically send an updated data package from a server to a central server associated with an operator (e.g., an airline). Such data packages often include many gigabytes of data. The operator distributes the data packages to each client computer system associated with the corresponding piece of equipment.

It is generally known to provide data at a server for download by a remote computer system. However, the size of a complete technical manual may render such an approach infeasible for locations with limited bandwidth to the server and/or low tolerance for downtime of client computer systems. Therefore, the operator typically generates physical media (e.g., DVDs) and delivers the physical media to a plurality of sites having such client computer systems. Installation of an updated data package is performed locally at each client computer system. As such, known processes are both time and labor intensive, requiring physical handling of media and significant downtime for client computer systems as updated data packages are installed.

In addition, known processes do not check for problems (e.g., corruptions or errors) associated with updated technical manual data. Therefore, the user of a client computer system becomes aware of a failure in the installation of an update only upon use of the client computer system, which may occur at a time and/or place with limited access to technical support. As such, resolving installation failures requires a degree of troubleshooting knowledge and introduces further downtime for an affected client computer system.

BRIEF DESCRIPTION

In one aspect, a method is provided for providing a current version of a technical manual to a client computer system that has a prior version of the technical manual. The method includes creating the current version of the technical manual at a server computer system. Delta data representing a plurality of differences between the prior version of the technical manual and the current version of the technical manual is generated by the server computer system. The delta data is transmitted to the client computer system, which applies the delta data to the prior version of the technical manual to produce the current version of the technical manual.

In another aspect, a system is provided for providing a current version of a technical manual to a client computer system having a prior version of the technical manual. The system includes a server computer system that includes a storage device configured to store the current version of a technical manual. The server computer system also includes a processor unit that is coupled to the storage device and programmed to generate delta data representing a plurality of differences between the prior version of the technical manual and the current version of the technical manual. The processor unit is also programmed to create an update installation package including the delta data. The update installation package is operable to transform the prior version of the technical manual to the current version of the technical manual. The server computer system also includes a communications unit that is coupled to the processor unit and configured to transmit the update installation package to a client computer system.

In yet another aspect, one or more computer readable media having computer-executable components is provided. The computer-executable components include a version comparison component and an update packaging component. When executed by at least one processor unit, the version comparison component causes the at least one processor unit to determine that a current version of a technical manual that describes physical equipment is newer than a prior version of the technical manual. When executed by at least one processor unit, the update packaging component causes the at least one processor unit to generate delta data representing at least one difference between a prior version of a technical manual and a current version of the technical manual, and to create an update installation package including the delta data. The update installation package is operable to transform the prior version of the technical manual to the current version of the technical manual.

The features, functions, and advantages that have been discussed can be achieved independently in various embodiments or may be combined in yet other embodiments further details of which can be seen with reference to the following description and drawings.

DETAILED DESCRIPTION

Figure 1:
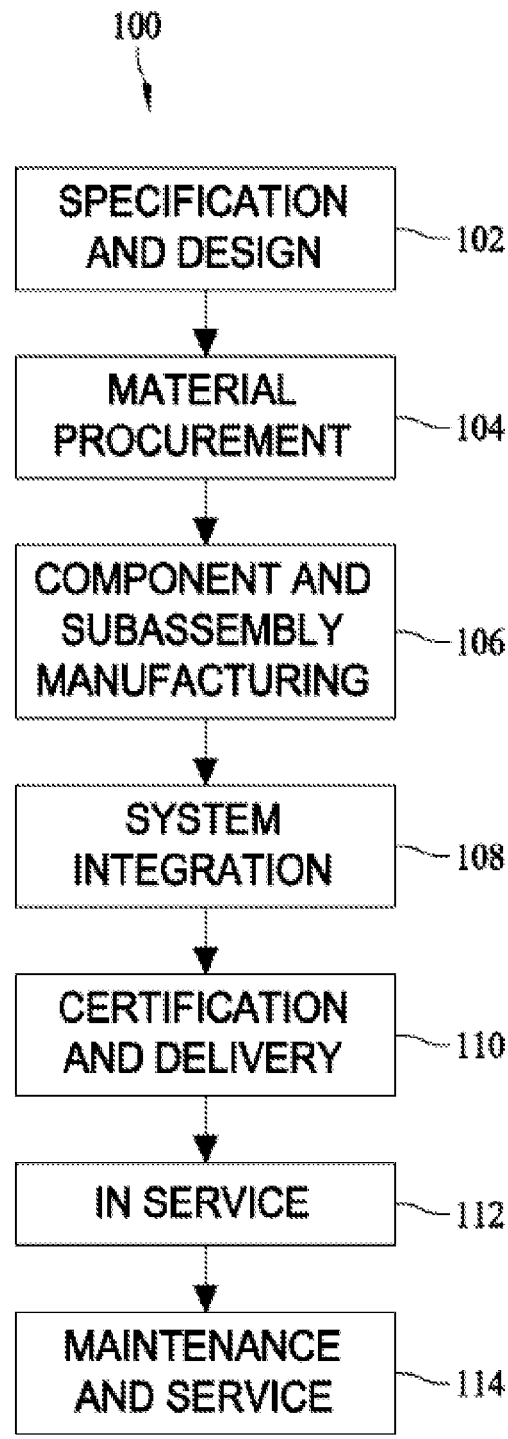
FIG. 1 is a flow diagram of an aircraft production and service methodology.

The described embodiments are directed to the generation of download data packages on a staging server, which in turn provides for the automated delivery and installation of such data packages to client computer systems, such as maintenance laptops. In an exemplary embodiment, the data packages include data associated with a technical manual for a piece of equipment, such as, but not limited to, an aircraft. Such data packages may be referred to as "toolbox data" or "toolbox data packages."

The embodiments include a tool set that facilitates automation, version control, checks to ensure data is in a correct state before installation, a rollback mechanism, a decrease in the size of toolbox data packages by approximately 40%, history information for toolbox data packages, and a point of failure recovery for both transfer and installation of data. As described further herein, embodiments provided herein facilitate eliminating unneeded content in these data packages, in addition to compressing the data, to allow distribution of data update installation packages to remote sites.

A technical manual includes content describing the structure (e.g., components), assembly, operation, maintenance, and/or repair of physical and/or tangible equipment. The content may include, for example, formatted text, diagrams, images, visual models in two or three dimensions, computer-aided design (CAD) models, animations, videos, and/or references to internal and/or external resources (e.g., hyperlinks). In an exemplary embodiment, a technical manual includes content describing maintenance of an aircraft and is formatted according to the S1000D specification.

A technical manual may be distributed as a full installation package, which is operable to install the technical manual on a computer system. For example, a full installation package may include, without limitation, an archive file, such as a tape archive (tar) or "zip" file, a compressed archive file, a self-extracting archive, and/or an executable installer program including computer-executable instructions for installing a technical manual to a computer system.

Some embodiments facilitate validating data, such as an installation package and/or individual files (e.g., contained in an installation package). Several modes of validation are contemplated and may be used in isolation or in combination. Data may be validated by ensuring the data is complete and/or free from corruption. For example, data expected to be in a particular format (e.g., S1000D) may be parsed to ensure the content of the data conforms to the format. Another form of validation includes determining an actual value representing the data and comparing the actual value to an expected value. The values may include, but are not limited to, data sizes (e.g., file sizes), file names, checksums of the data, and/or hash values (e.g., an MD5, SHA-1, or SHA-2 hash) of the data.

Provided embodiments facilitate distributing an update to a technical manual by converting a full installation package for a new version of a technical manual into an update installation package by eliminating at least some data that is present in both the new version and a prior version of the technical manual. The update installation package is significantly smaller in size than a full installation package for the technical manual. As further described herein, at least one embodiment is directed to an automated process for creation and delivery of S1000D data packages. One specific purpose of the described toolset is the distribution of toolbox data to maintenance laptops associated with an aircraft. However, because S1000D is an international standard, the embodiments and described processes can be used with other types of data and in other industries, as well.

In the aircraft maintenance context, a full installation package is sent by an equipment and/or equipment services provider to a staging server associated with an equipment operator. For example, the equipment operator may be a client of the equipment provider. The staging server is configured to compare the new version of the technical manual provided by the full installation package to a prior version of the technical manual (e.g., the most recent technical manual distributed to the client computer systems of the equipment operator) and to assemble an update installation package operable to apply a "delta", or a set of differences between the two versions, to a client computer system. The update installation package is transmitted to a plurality of client computer systems associated with the equipment operator.

Figure 2:
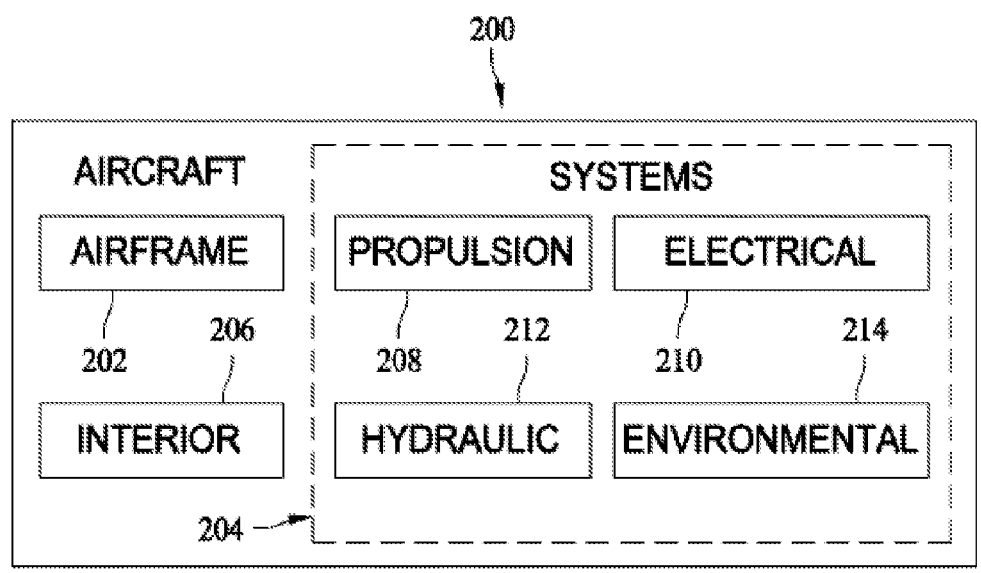
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
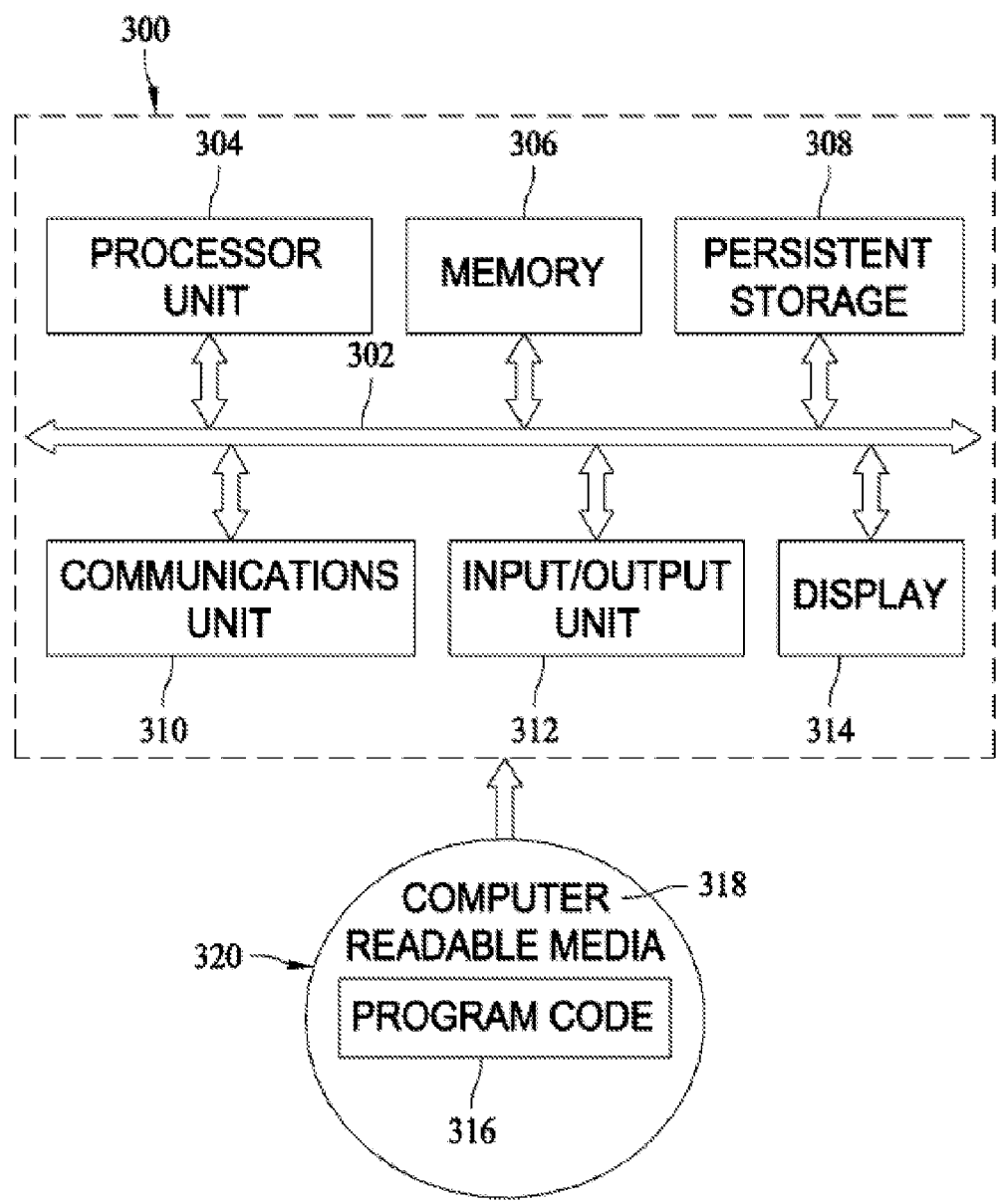
FIG. 3 is a diagram of a computer system.

Turning now to FIG. 3, a diagram of a computer system is depicted in accordance with an illustrative embodiment. In this illustrative example, computer system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other computer systems or devices. In these examples, communications unit 310 is a network interface card. Communications unit 310 may provide communications through the use of either or both physical and wireless communication links.

Input/output unit 312 allows for input and output of data with other devices that may be connected to computer system 300. For example, without limitation, input/output unit 312 may provide a connection for user input through a user input device, such as a keyboard and/or a mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions and/or computer-executable instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to computer system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to computer system 300. The tangible form of computer readable media 318 is also referred to as computer recordable storage media. In some instances, computer readable media 318 may not be removable.

Alternatively, program code 316 may be transferred to computer system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or computer system for use within computer system 300. For instance, program code stored in a computer readable storage medium in a server computer system may be downloaded over a network from the server to computer system 300. The computer system providing program code 316 may be a server computer, a client computer, or some other device capable of storing and transmitting program code 316.

Program code 316 may be organized into computer-executable components that are functionally related. For example, program code 316 may include a version comparison component, an update packaging component, and installation component, and/or any component suitable for the methods described herein. Each component may include computer-executable instructions that, when executed by processor unit 304, cause processor unit 304 to perform one or more of the operations described herein.

The different components illustrated for computer system 300 are not meant to provide architectural limitations to the manner in which different embodiments may be implemented. The different illustrative embodiments may be implemented in a computer system including components in addition to or in place of those illustrated for computer system 300. Other components shown in FIG. 3 can be varied from the illustrative examples shown.

As one example, a storage device in computer system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system is operable for generation of update installation packages on a staging server, such as processing system 300, to provide automated delivery and installation of updated technical manuals to maintenance laptops, for example, via communications unit 310.

Figure 4:
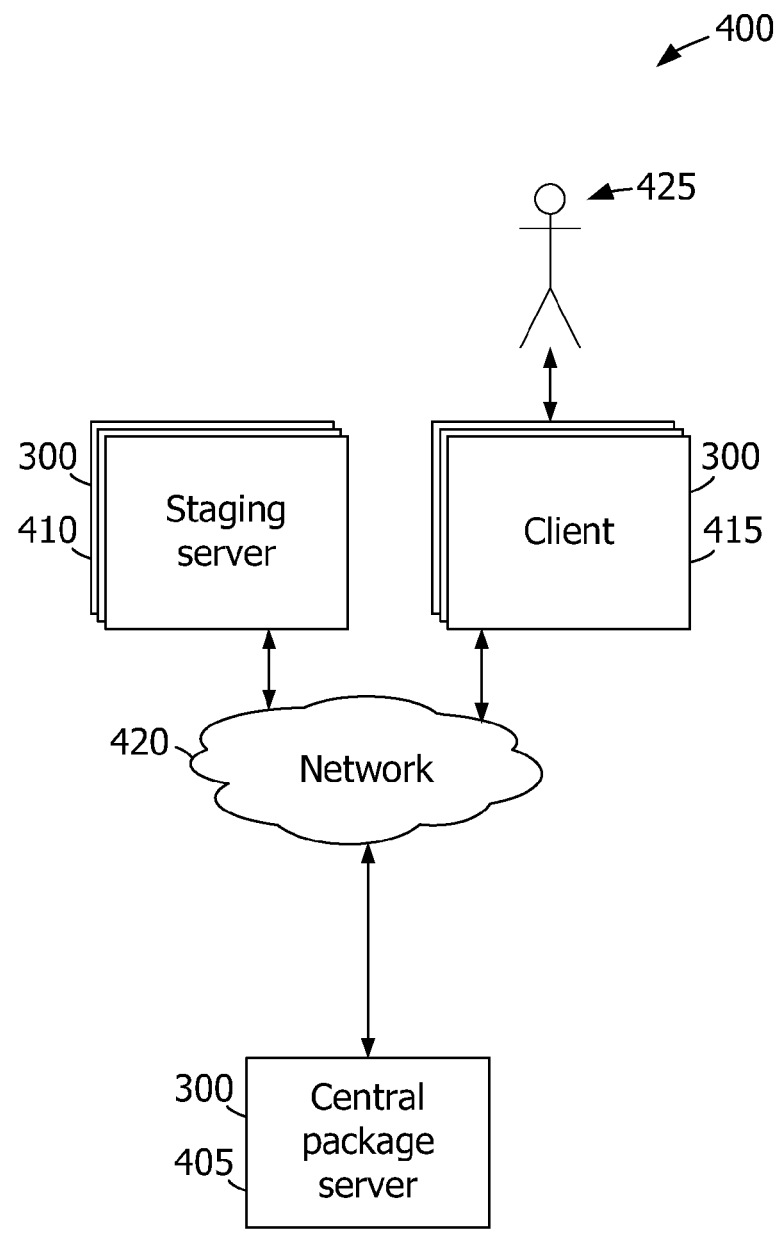
FIG. 4 is a block diagram illustrating a system for distributing a technical manual.

FIG. 4 is a block diagram illustrating a system 400 for distributing a technical manual. System 400 includes an central package server 405, an staging server 410, and an client computer system 415 coupled in communication via a network 420. Network 420 may include, without limitation, the Internet, a local area network (LAN), a wide area network (WAN), a wireless LAN (WLAN), a mesh network, and/or a virtual private network (VPN). In an exemplary embodiment, central package server 405 is associated with an equipment provider, such as an aircraft producer, and staging server 410 and client computer system 415 are associated with an equipment operator.

Central package server 405, staging server 410, and client computer system 415 are separate instances of computing device 300 (shown in FIG. 3). In the exemplary embodiment, each computing device 300 is coupled to network 420 via communications unit 310. In an alternative embodiment, central package server 405 is integrated with staging server 410 and/or with client computer system 415.

Central package server 405 is configured to create, receive, and/or store one or more technical manuals (e.g., in memory 306). Central package server 405 may also be configured to generate a full installation package for a version of a technical manual. A full installation package is operable to install the version of the technical manual on a computer system that has no version of the technical manual or that has a prior version of the technical manual. Central package server 405 may distribute the version of the technical manual to a plurality of staging servers 410.

In an exemplary embodiment, staging server 410 is configured to receive a current version of the technical manual from central package server 405 and to store the current version (e.g., in memory 306). Staging server 410 may also include a prior version of the technical manual. Staging server 410 is further configured to generate an update installation package operable to transform the prior version to the current version and to transmit the update installation package to one or more client computer systems 415. For example, an airline may operate a plurality of client computer systems 415 which receive update installation packages from staging server 410.

Client computer system 415 is configured to interact with a user 425 (e.g., via user input/output unit 312 and/or display 314). User 425 may include, without limitation, maintenance personnel. In one embodiment, client computer system 415 is configured to receive an update request indicating that an update installation package should be downloaded and/or installed at client computer system 415. For example, user 425 may enter a one-time update request indicating that client computer system 415 should identify, download, and/or install a new version of an installed technical manual at the time the update request is entered. In another example, user 425 enters a repeated update request indicating that client computer system 415 should repeatedly (e.g., periodically and/or continually) determine whether a new version of the technical manual is available from staging server 410.

In response to an update request, client computer system 415 is configured to download an update installation package, if available, and install the update installation package, as described in more detail below. Providing an update installation package to client computer systems 415 in place of a full installation package facilitates substantially reducing an amount of data transferred between staging server 410 and client computer systems 415.

In some embodiments, client computer system 415 is remote to central package server 405 and/or staging server 410. For example, client computer system 415 may be located at a support facility geographically removed from central package server 405. Such embodiments facilitate remotely defining source code portions of interest and monitoring execution events. For example, user 425 may remotely monitor live execution activity at central package server 405 operated by a customer of user 425.

Figure 5:
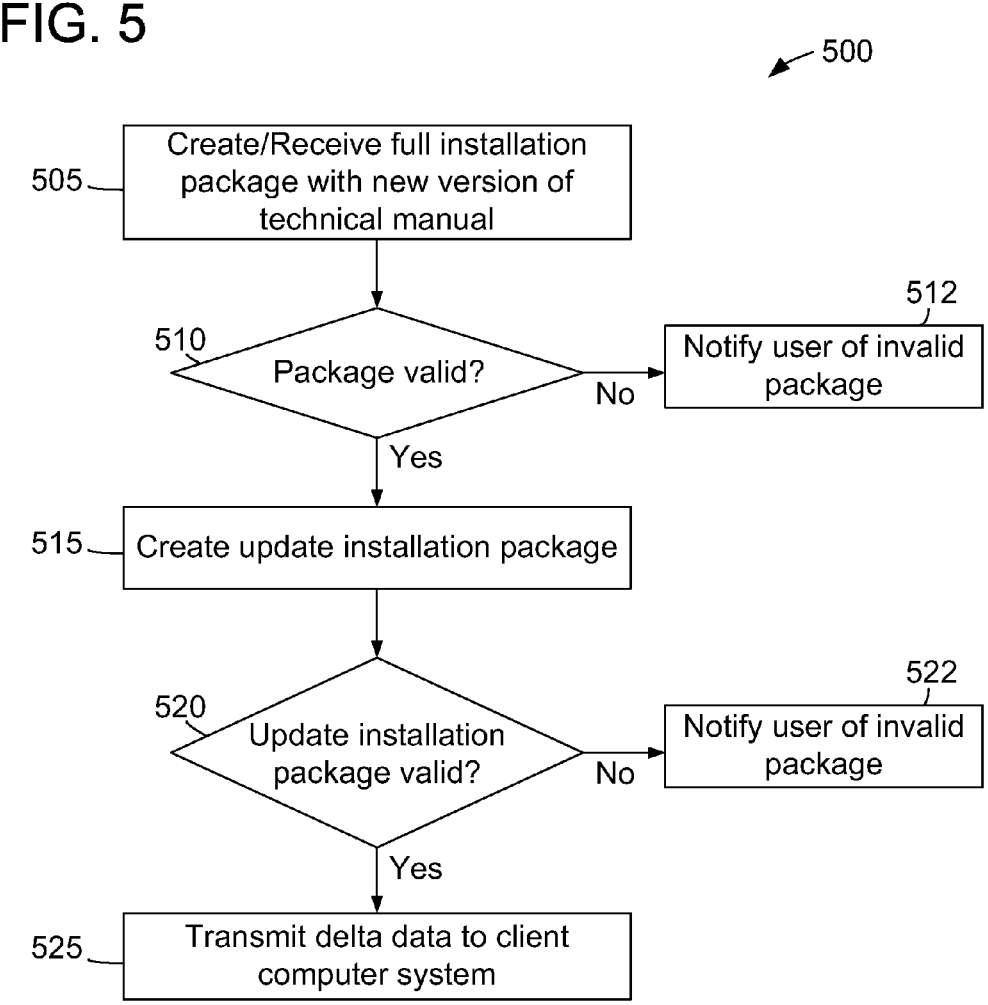
FIG. 5 is a flowchart illustrating an exemplary method for providing a current version of a technical manual to a client computer system that has a prior version of the technical manual.

FIG. 5 is a flowchart illustrating an exemplary method 500 for providing a current version of a technical manual to a client computer system that has a prior version of the technical manual. All or a portion of method 500 may be performed by a computer system 300, such as, without limitation, central package server 405 and/or staging server 410 (shown in FIGS. 3 and 4).

Method 500 includes creating and/or receiving 505 a full installation package including a new or "current" version of a technical manual. For example, a staging server may receive a full installation package from a local user or a remote device, such as a central package server. The staging server may be configured periodically request or "poll" the central package server for any available updated full installation package and receive the full installation package in response. In addition, or alternatively, the staging server may be configured to accept a transmission of the full installation package that is initiated by the central package server.

The full installation package is validated 510. For example, the full installation package may be validated 510 by verifying that the full installation package can be parsed and/or by verifying that the current version of the technical manual extracted from the full installation package can be parsed. In another example, the full installation package may include an expected checksum and/or hash value for one or more files associated with the technical manual. The full installation package may be validated 510 by calculating a checksum and/or hash value for the one or more files after extracting the technical manual from the full installation package, and by comparing the calculated checksum and/or hash value to the expected checksum and/or hash value.

If the full installation package is not valid, a user is notified 512 of the validation failure. If the full installation package is valid, an update installation package is created 515. The update installation package includes delta data representing differences between the prior version and the current version of the technical manual.

Figure 6:
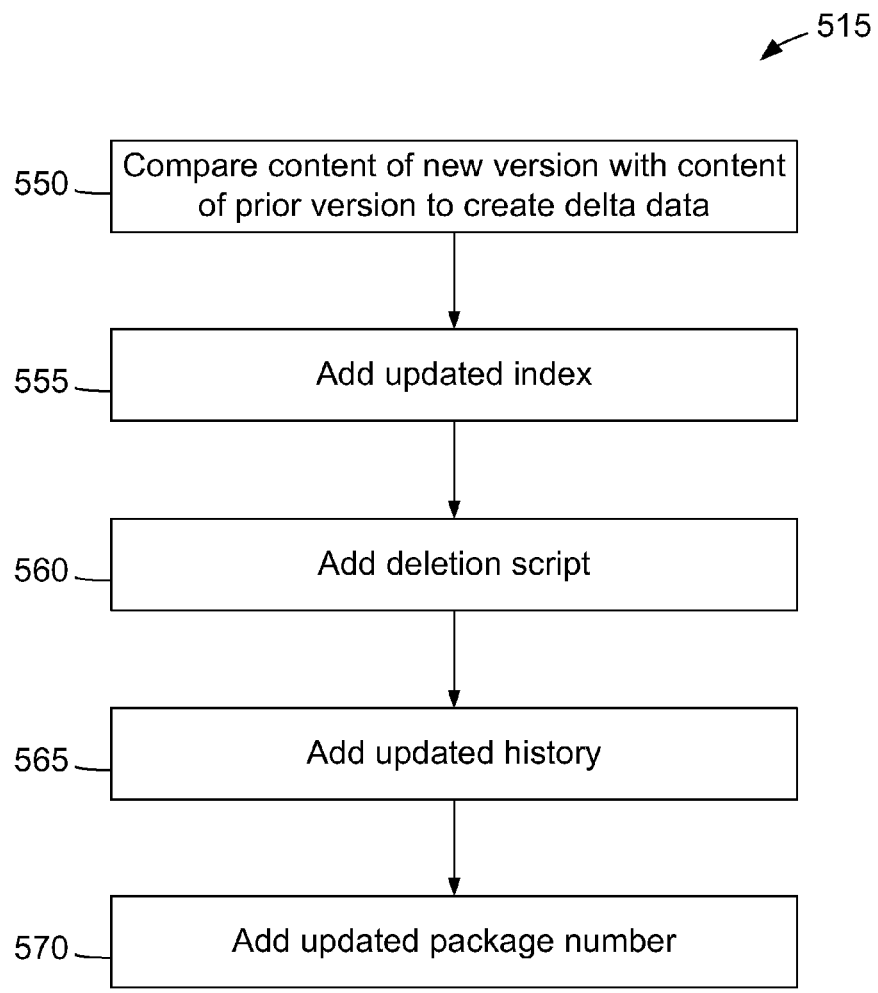
FIG. 6 is a flowchart illustrating an exemplary method for creating an update installation package in accordance with the process shown in FIG. 5.

FIG. 6 is a flowchart illustrating an exemplary method for creating 515 an update installation package. In the exemplary embodiment, the content of the new version of the technical manual is compared 550 with the content of a prior version of the technical manual to create delta data. The delta data represents one or more differences between the prior version and the current version. For example, the delta data may indicate one or more additions, deletions, and/or modifications of data within the technical manual. In one embodiment, delta data includes, for each difference, an indication of a start position in the prior version of the technical manual and an indication of the operation to apply. The operation may include an addition with data to add; a deletion with an indication of a length or extent of data to delete and/or an end position to delete to; or a modification with replacement data and an indication of a length or extent of data to replace and/or an end position to replace to. The delta data is included in an update installation package. Positions and/or lengths may be expressed as bytes, characters, lines, blocks, and/or any measure suitable for use with the methods described.

In some embodiments, an updated index is added 555 to the update installation package. For example, the technical manual may include content having a plurality of content portions (e.g., terms, phrases, subjects, and/or sections). The index may include references to positions within the technical manual at which each content portion appears. Because the content of the technical manual is different between the prior version and the current version, the index may be updated to reflect the positions of the content portions within the new version of the technical manual. The updated index may be added 555 to the update installation package in its entirety or as index delta data representing differences between the prior index and the current index.

A deletion script may be added 560 to the update installation package. The deletion script includes computer-executable instructions for removing obsolete and/or temporary data from a computer system after the current version of the technical manual is installed. For example, the deletion script may include instructions for deleting prior index data and/or data that corresponds to the prior version of the technical manual but does not correspond to the current version of the technical manual. In another example, the deletion script may include instructions for deleting temporary data produced while applying the update installation package and, optionally, the update installation package itself.

In some embodiments, an updated history is added 565 to the update installation package. The updated history includes data representing one or more revisions to the technical manual. For example, the history may include a summary of each significant modification to the technical manual included an update.

An updated package number may also be added 570 to the update installation package. A package number indicates, for example, a revision level of the technical manual. In addition, or alternatively, the package number may indicate both the prior version and the current version for which the update installation package is being generated. Such an embodiment facilitates distinguishing between update installation packages that may be applied to different prior versions of the technical manual.

Once complete, and referring back to FIG. 5, the update installation package is validated 520. If the update installation package is not valid, a user is notified 522 of the validation failure. In one embodiment, the update installation package is validated 520 by applying the update installation package against a copy of the prior version of the technical manual and verifying that the resulting copy of the technical manual is identical or substantially identical to a copy of the technical manual created by the full installation package. For example, the two copies of the technical manual may be compared based on file names, file sizes, file contents (e.g., calculating checksums and/or hash values), and/or any means for determining equality between files.

The update installation package is transmitted 525 to the client computer system. The update installation package includes the delta data. In some embodiments, the update installation package includes a validation means, such as, without limitation, one or more expected checksums or expected hash values associated with the new version of the technical manual.

Figure 7:
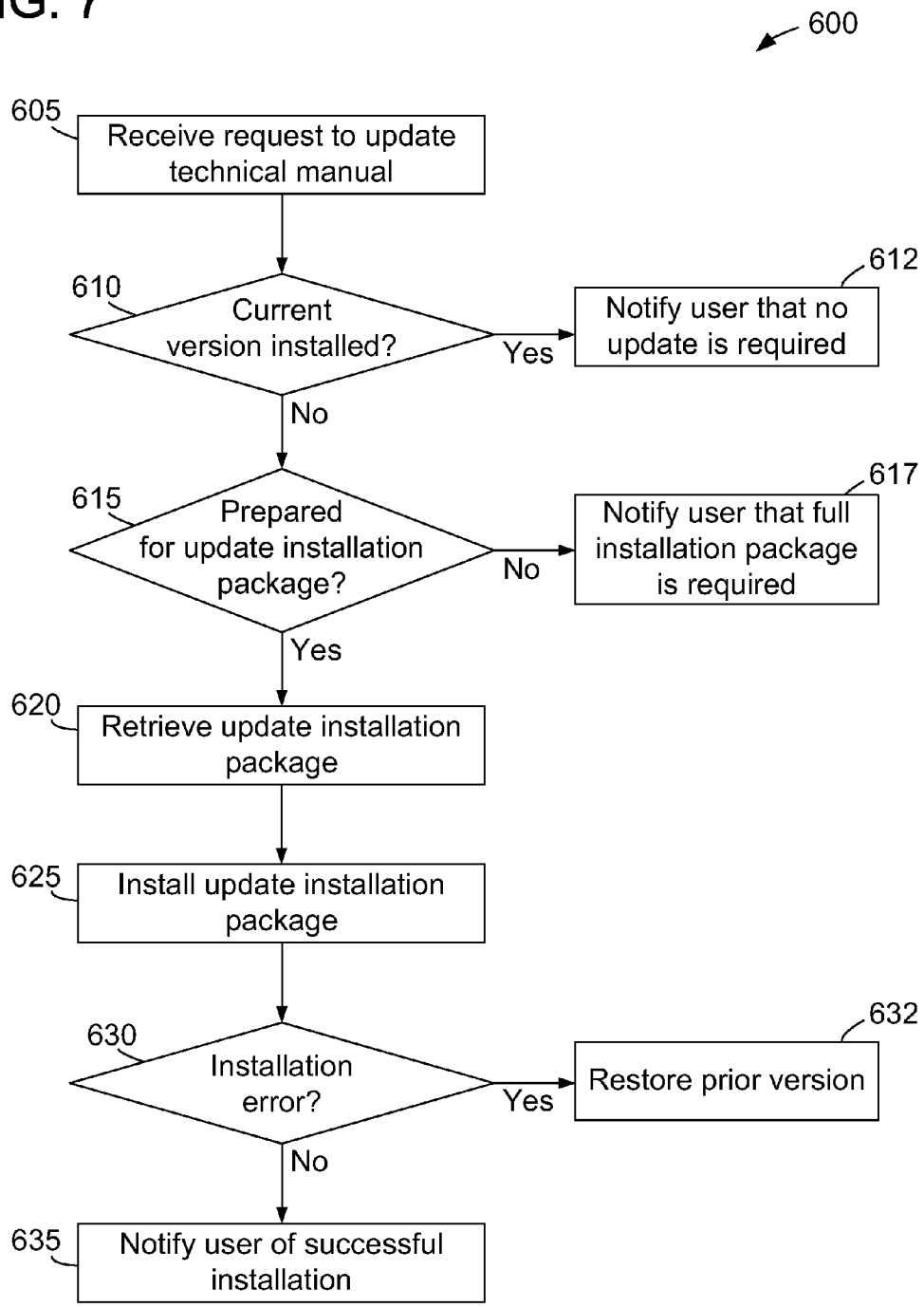
FIG. 7 is a flowchart illustrating an exemplary method for updating a technical manual at a client computer system in accordance with the process shown in FIG. 5.

FIG. 7 is a flowchart illustrating an exemplary method 600 for updating a technical manual at a client computer system in accordance with method 500. All or a portion of method 600 may be performed by a computer system 300, such as client computer system 415 (shown in FIGS. 3 and 4).

Method 600 includes receiving 605 an update request indicating that an installed technical manual should be updated, if possible. For example, a one-time update request or an automatic update request may be received 605. A one-time update request indicates that the computer system should query a staging server and/or a central package server for any available updated technical manual. An automatic update request indicates that the computer system should query the staging server and/or the central package server on a repeated (e.g., periodic) basis.

The computer system determines 610 whether the current version is installed. In some embodiments, metadata associated with the current version is compared with metadata associated with the installed version. Metadata may include, but is not limited to, an installation package identifier and/or number, a version identifier and/or number, a production date, and/or a release date.

In one embodiment, the computer system transmits the metadata associated with the installed version to a staging server and/or central package server, which compares the installed version metadata to the current version metadata and responds with an indication of whether the installed version is the current version and/or whether the current version is newer than the installed version. In an alternative embodiment, the computer system transmits a request for current version metadata to a staging server or central package server. The staging server or central package server responds with the current version metadata, and the computer system compares the installed version metadata to the current version metadata to determine 610 whether the installed version is the current version and/or whether the current version is newer than the installed version.

If the current version is installed, a user may be notified 612 that no update to the technical manual is available and/or required. For example, the user may be notified via a display, an input/output unit, and/or a communications unit. If the computer system has received an automatic update request, such notification may be omitted.

If the current version is not installed, the computer system determines 615 whether the computer system is prepared for installation of the update installation package. For example, the computer system may determine whether an installation destination (e.g., a directory in a file system) is designated as read-only and/or whether any data associated with the technical manual has been modified (e.g., by comparing time stamps associated with the data to a timestamp associated with the most recent installation).

If the computer system is not prepared for the update installation package, the user is notified 617 that the update installation package cannot be installed and/or that updating the technical manual requires a full installation package.

If the computer system is prepared for the update installation package, the update installation package is retrieved 620 from a staging server or a central package server. In one embodiment, the computer system downloads the update installation package to a persistent storage device in portions and maintains a record of which portions have been downloaded. If the download process is interrupted, the computer system may subsequently resume the download using the record of downloaded portions to identify portions which have not been downloaded.

Figure 8:
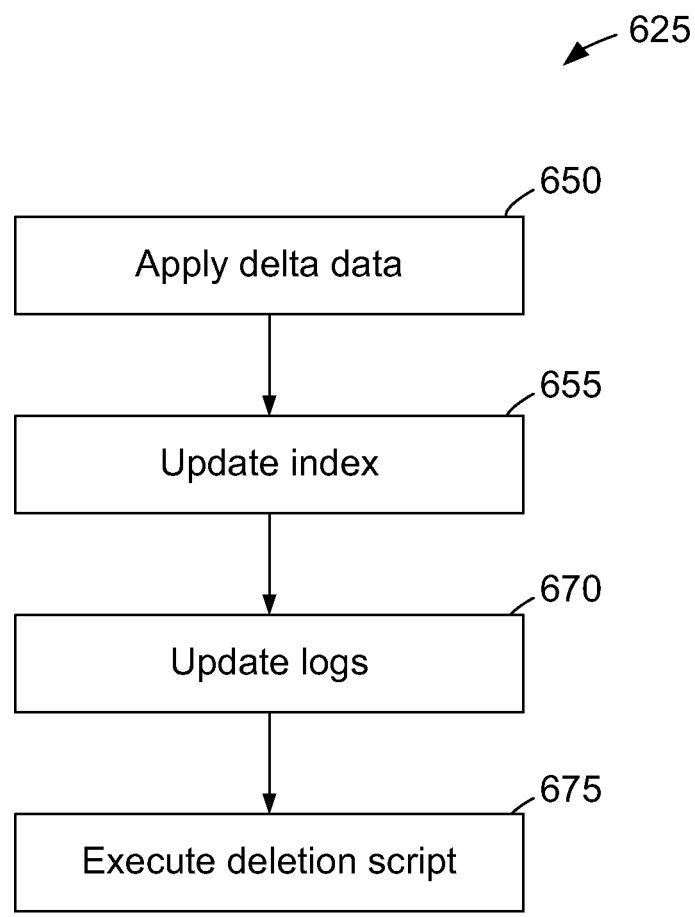
FIG. 8 is a flowchart illustrating an exemplary method process for installing an update installation package in accordance with the process shown in FIG. 7.

The update installation package is installed 625 at the computer system. FIG. 8 is a flowchart illustrating an exemplary method for installing 625 an update installation package. In the exemplary embodiment, the prior version of the technical manual is already installed at the computer system. Delta data from the update installation package is applied 650 to the prior version of the technical manual to transform the prior version into the current version. For example, the delta data may indicate one or more additions, deletions, and/or modifications to apply to the data associated with the prior version of the technical manual.

If the update installation package includes an updated index, the index associated with the technical manual is updated 655 to reflect any modifications contained in the updated index. In one embodiment, the update installation package includes the updated index in its entirety, and the prior index is replaced with the updated index.

An installation and/or maintenance log may be updated 670 to reflect the installation of the current version of the technical manual. For example, the log may be updated 670 to include a time at which the update installation package is installed and/or information from the update installation package, such as, without limitation, the updated history and/or the updated package number.

If a deletion script is included in the update installation package, the deletion script may be executed 675 to remove obsolete and/or temporary data from the computer system, as described above.

Referring again to FIG. 7, the installation process is monitored to determine 630 whether any errors have occurred while installing 625 the update installation package. For example, the application 650 of delta data may be monitored for an input/output error and/or an abnormal termination. In addition, or alternatively, determining 630 whether any installation errors occurred may include validating the newly updated technical manual at the computer system. For example, validation values, such as file names, file sizes, checksums, and/or hash values, may be determined for the technical manual at the computer system after installing the update installation package, and the validation values may be compared to expected values provided in the update installation package.

If an installation error occurred, the computer system restores 632 the prior version of the technical manual. In one embodiment, the update installation package includes a "rollback" script with computer-executable instructions for reverting the computer system to the prior version of the technical manual. In another embodiment, the computer system generates the rollback script as it installs 625 the update installation package. In yet another embodiment, the computer system generates a backup of the prior version of the technical manual prior to installing 625 the update installation package and restores 632 the prior version by extracting the backup. Data related to the failed installation may be deleted or may be preserved for inspection and/or troubleshooting.

If no installation errors occurred, the user is notified 635 of the successful installation of the current version of the technical manual. Notifying 635 the user of the successful installation may include presenting (e.g., via a display or input/output unit) the updated package number and/or the updated history provided with the update installation script.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing a current version of a technical manual to a client computer system having a prior version of the technical manual, said method comprising:
   determining that the current version of a technical manual is newer than the prior version of the technical manual;
   creating the current version of the technical manual at a server computer system;
   generating, by the server computer system, delta data representing a plurality of differences between the prior version of the technical manual and the current version of the technical manual;
   defining by the server computer system, an index representing a position of a plurality of content portions within a content of the current version of the technical manual;
   creating an update installation package including the delta data and the index, the update installation package operable to transform the prior version of the technical manual to the current version of the technical manual;
   generating, by the server computer system, a deletion script operable to delete, from the client computer system, data that corresponds to the prior version of the technical manual and does not correspond to the current version of the technical manual; and
   transmitting the delta data and the update installation package with the deletion script from the server computer system to the client computer system, wherein the client computer system applies the delta data and the deletion script to the prior version of the technical manual to produce the current version of the technical manual.

2. A method in accordance with claim 1, wherein creating the current version of the technical manual comprises creating a technical manual including formatted text and a plurality of images describing tangible equipment.

3. A method in accordance with claim 1, wherein creating the current version of the technical manual comprises creating a technical manual describing a plurality of maintenance procedures for a vehicle.

4. A method in accordance with claim 1, wherein creating the current version of the technical manual comprises creating a full installation package including a content, and transmitting the delta data to the client computer system comprises transmitting an update installation package including the delta data, wherein the update installation package is operable to transform the prior version of the technical manual to the current version of the technical manual.

5. A method in accordance with claim 4, wherein creating the full installation package comprises creating a full installation package operable to install the current version of the technical manual at the client computer system.

6. A method in accordance with claim 4, further comprising:
   determining whether the full installation package is valid; and
   performing said generating the delta data based on determining that the full installation package is valid.

7. A method in accordance with claim 4, further comprising:
   determining whether the update installation package is valid; and
   performing said transmitting the update installation package based on determining that the update installation package is valid.

8. A method in accordance with claim 1, further comprising determining that current version of the technical manual is newer than the prior version of the technical manual.

9. A method in accordance with claim 8, wherein determining that the current version of the technical manual is newer than the prior version of the technical manual comprises comparing metadata associated with the current version to metadata associated with the prior version.

10. A method in accordance with claim 9, further comprising:

receiving at the server computer system the metadata associated with the prior version of the technical manual from the client computer system; and transmitting an indication that the current version is newer than the prior version.

11. A system for providing a current version of a technical manual to a client computer system having a prior version of the technical manual, said system comprising a server computer system, said server computer system comprising:

a storage device configured to store the current version of a technical manual;

a processor unit coupled to said storage device and programmed to:

determine that the current version of a technical manual is newer than the prior version of the technical manual;

generate delta data representing a plurality of differences between the prior version of the technical manual and the current version of the technical manual;

define an index representing a position of a plurality of content portions within a content of the current version of the technical manual;

create an update installation package including the delta data and the index, the update installation package operable to transform the prior version of the technical manual to the current version of the technical manual; and generate a deletion script operable to delete from the client computer system data that corresponds to the prior version of the technical manual and does not correspond to the current version of the technical manual, wherein the update installation package further includes the deletion script; and a communications unit coupled to said processor unit configured to transmit, from said server computer system, the update installation package to a client computer system.

12. A system in accordance with claim 11, wherein said storage device is further configured to store a full installation package operable to install the current version of the technical manual at the client computer system.

13. A system in accordance with claim 11, wherein said processor unit is further programmed to create the update installation package at least in part by creating a plurality of computer-executable instructions that when executed by the client computer system transform the prior version of the technical manual to the current version of the technical manual.

14. A system in accordance with claim 11, wherein said processor unit is further programmed to validate the update installation package before said communications unit transmits the update installation package to the client computer system.

15. A system in accordance with claim 11, further comprising the client computer system, wherein said client computer system comprises:

an input device configured to receive an update request; and a processor unit coupled to the input device and programmed to request the update installation package from the server computer system when the current version is newer than the prior version.

16. A system in accordance with claim 15, wherein said client computer system further comprises a storage device configured to store the prior version of the technical manual, and said processor unit of said client computer system is coupled to said storage device and further programmed to install the update installation package to transform the prior version of the technical manual to the current version of the technical manual.

17. A system in accordance with claim 16, wherein said processor unit of said client computer system is further programmed to:

determine whether the installation of the update installation package completed successfully; and when the installation of the update installation package did not complete successfully, restore the prior version of the technical manual in said storage device of said client computer system.

18. One or more non-transitory computer readable media having computer-executable components, said components comprising:

a version comparison component that when executed by at least one processor unit causes the at least one processor unit to determine that a current version of a technical manual is newer than a prior version of the technical manual, the technical manual describing physical equipment; and an update packaging component that when executed by at least one processor unit causes the at least one processor unit to:

generate delta data representing at least one difference between a prior version of a technical manual and a current version of the technical manual;

defining an index representing a position of a plurality of content portions within a content of the current version of the technical manual;

create an update installation package including the delta data and the index, the update installation package operable to transform the prior version of the technical manual to the current version of the technical manual;

generate a deletion script operable to delete from the client computer system data that corresponds to the prior version of the technical manual and does not correspond to the current version of the technical manual, wherein the update installation package further includes the deletion script; and transmit the update installation package from a server computer system to the client computer system.

19. The one or more non-transitory computer readable media in accordance with claim 18, wherein the server computer system comprises the at least on processor unit.

* * * * *